Patented Dec. 5, 1922.

UNITED STATES PATENT OFFICE.

EDWARD H. FRENCH AND JAMES R. WITHROW, OF COLUMBUS, OHIO, AND AUSTIN O. ALLEN, OF READING, PENNSYLVANIA, ASSIGNORS TO THE GLIDDEN COMPANY, OF CLEVELAND, OHIO, A CORPORATION OF OHIO.

SOLUBLE LIME-SULPHUR COMPOSITION.

No Drawing.  Application filed July 24, 1919.  Serial No. 312,992.

*To all whom it may concern:*

Be it known that we, EDWARD H. FRENCH, JAMES R. WITHROW, and AUSTIN O. ALLEN, citizens of the United States, and residents, respectively, of Columbus, county of Franklin, State of Ohio, and Reading, in the county of Berks and State of Pennsylvania, have invented a certain new and useful Improvement in Soluble Lime-Sulphur Composition, of which the following is a full, clear, and exact description.

The value and usefulness of calcium poly-sulphides, commonly known as lime sulphur composition as an insecticide and fungicide is perfectly well known.

Additionally it is, chemically speaking, generally well known that calcium poly-sulphide may be prepared by boiling water together with calcium hydrate and finely divided sulphur.

The calcium poly-sulphide when in solution is quite stable but when the solution is evaporated to concentrated form or to dryness, decomposition takes place which renders the residue quite if not entirely insoluble.

Commercial requirements demand the handling and shaping of the poly-sulphide in dry or concentrated form, while the actual use of the composition as an insecticide or fungicide requires that it be soluble in water.

With the foregoing considerations in mind the purpose of the present invention may be stated to consist in the provision of calcium poly-sulphide and a method of making the same wherein the poly-sulphide when formed is stabilized and remains undecomposed and in soluble form even when evaporated to substantial dryness.

The following description sets forth in detail one of the various ways in which the principle underlying the invention may be utilized.

Calcium hydrate or slaked lime is mixed with finely divided sulphur in the proportions of approximately one part of lime and two parts of sulphur. This is added to a sufficient quantity of water and the mixture is strongly heated until the chemical reaction is completed. The resultant solution produced having a density of approximately 32° to 35° Baumé.

The following emperical formulæ expresses the theoretical reaction which takes place:

$$3Ca(OH)_2 + 12S = 2CaS_5 + CaS_2O_3 + 3H_2O$$

As will be seen from the foregoing, the resultant solution contains calcium poly-sulphide with a small amount of calcium thiosulphate which is not harmful.

The solution after proceeding as above, is filtered or allowed to settle and decanted and then there is added a quantity of an albuminous substance such as glue, gelatine, liquid tankage, stickliquor which is the albuminous residue of animal bodies. This albuminous substance is added to the extent of about 5% by weight of the poly-sulphide solution.

Preferably the albuminous substance is put into solution in a small quantity of water before it is added to the poly-sulphide solution.

The solution is then evaporated to dryness or nearly so, preferably in a vacuum dryer. The albuminous substance reacts or combines with the calcium poly-sulphide in solution in a manner to change the unstable calcium poly-sulphide to a stable calcium poly-sulphide without in any way injuring the insecticidal or fungicidal properties thereof.

The exact reaction which takes place and the reason for such reaction are not definitely known to us at the present time but the results are none the less definite and certain.

Calcium poly-sulphide made in accordance with our process and reduced to dry state is readily soluble in water.

Various modifications in the method herein described may be employed without departing from the spirit of this invention provided that the means stated in any of the following claims or the equivalent thereof be employed.

Having described our invention, we claim

1. A composition of matter for the purpose described comprising calcium poly-sulphide and an albuminous substance.

2. A composition of matter for the purpose described comprising an alkaline earth poly-sulphide and an albuminous substance.

3. A compound including a solid polysulfid in particles and proteid matter incasing such particles.

In testimony whereof, we hereunto affix our signatures.

EDWARD H. FRENCH.
JAMES R. WITHROW.
AUSTIN O. ALLEN.